United States Patent [19]

Torrington

[11] 4,357,698

[45] Nov. 2, 1982

[54] VIDEO DISC PLAYER HAVING CADDY-ACTUATED RECORD RECEIVING PADS

[75] Inventor: Leslie A. Torrington, Indianapolis, Ind.

[73] Assignee: RCA Corporation, New York, N.Y.

[21] Appl. No.: 183,666

[22] Filed: Sep. 2, 1980

[51] Int. Cl.³ ............................................. G11B 17/04
[52] U.S. Cl. ..................................................... 369/77
[58] Field of Search ................... 369/77, 191, 192, 193, 369/194, 195; 360/86, 97, 98, 99, 133

[56] References Cited

U.S. PATENT DOCUMENTS 4,159,827 7/1979 Torrington ........................... 369/77
4,247,119 1/1981 Hughes ................................. 369/77

Primary Examiner—John W. Shepperd
Attorney, Agent, or Firm—E. M. Whitacre; J. S. Tripoli; D. A. Kulkarni

[57] ABSTRACT

A video disc player is provided with a set of depressible receiving pads for supporting a record retained therein. An actuating member, subject to engagement with a portion of a leading surface of a record caddy during insertion thereof into said player, depresses the record receiving pads to permit the caddy insertion.

4 Claims, 8 Drawing Figures

VIDEO DISC PLAYER HAVING CADDY-ACTUATED RECORD RECEIVING PADS

This invention relates to a disc record player, and more particularly, to a disc record player wherein a record is loaded into the player and removed therefrom, without the need for touching the record, by means of a protective caddy.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type pickup system is illustratively disclosed in U.S. Pat. No. 3,842,194 (Clemens).

To protect the video disc record, it is beneficial to enclose it in a caddy which comprises an outer jacket and a record retaining spine. For record loading, a full caddy is inserted into the player along a path defined by a pair of side rails. A record extraction mechanism disposed in the player removes the record/spine assembly from the jacket for retention in the player during subsequent jacket withdrawal. The retained record/spine assembly is supported in the player on a set of depressible receiving pads. To transfer the record to the turntable for playback, the turntable is raised relative to the receiving pads. The record player is provided with hold-down members which hold the retained spine in place while allowing the retained record to be picked up by the turntable when it is raised. During playback, the pickup stylus is traversed radially across the record while the turntable rotates the record at the desired speed (e.g., 450 rpm). For record retrieval, the record is transferred back to the receiving pads by lowering the turntable with respect to the receiving pads to redefine the record/spine assembly. The location of the receiving pads, occupying the raised position thereof is such that the record/spine assembly is aligned with the side rails. An empty jacket is then inserted into the player, whereby the record/spine assembly is returned back into the jacket. Withdrawal of the caddy from the player effects record retrieval. Reference is made to U.S. patent application, Ser. No. 122,959, entitled "STYLUS CLEANING APPARATUS FOR VIDEO DISC PLAYER", filed in the name of L. M. Hughes et al., now U.S. Pat. No. 4,285,524, for an example of a video disc player of the type mentioned above.

To allow the insertion of the caddy into the player free from interference with the record receiving pads, it is desirable to displace the receiving pads out of the way during the caddy insertion. To this end, one may depress the record receiving pads by means of the front edge of the caddy as it is inserted into the player, and then rely on the label surfaces of the caddy (i.e., one of the broad flat surfaces) to hold down the receiving pads in the depressed position. A problem with such an arrangement is that the receiving pads, which are in direct contact with the label surfaces of the caddy, leave scuff marks on the caddy labels. Another disadvantage is that the receiving pads have a tendency to cause bowing of the front edge of the caddy making activation of the receiving pads less reliable.

In accordance with this invention, an actuating member is disposed near one of the side rails for engagement with a side edge of the caddy such that the actuating member is displaced as the caddy is guided into the player. The record receiving pads, responsive to the motion of the actuating member, are deflected to a lowered position located out of the caddy insertion path during the insertion of the caddy into the player. The record receiving pads are thus deflected out of the caddy insertion path during the insertion of the caddy into the player without damaging the caddy labels and the front edge of the caddy.

Figure 1:
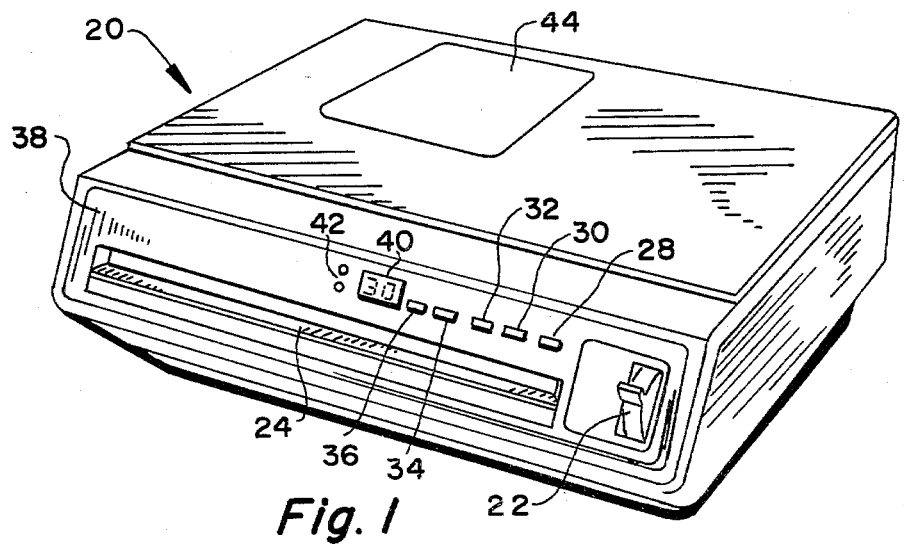
FIG. 1 shows a video disc player incorporating the caddy-actuated apparatus for deflecting the record receiving pads according to the instant invention.
Figures 5, 6:
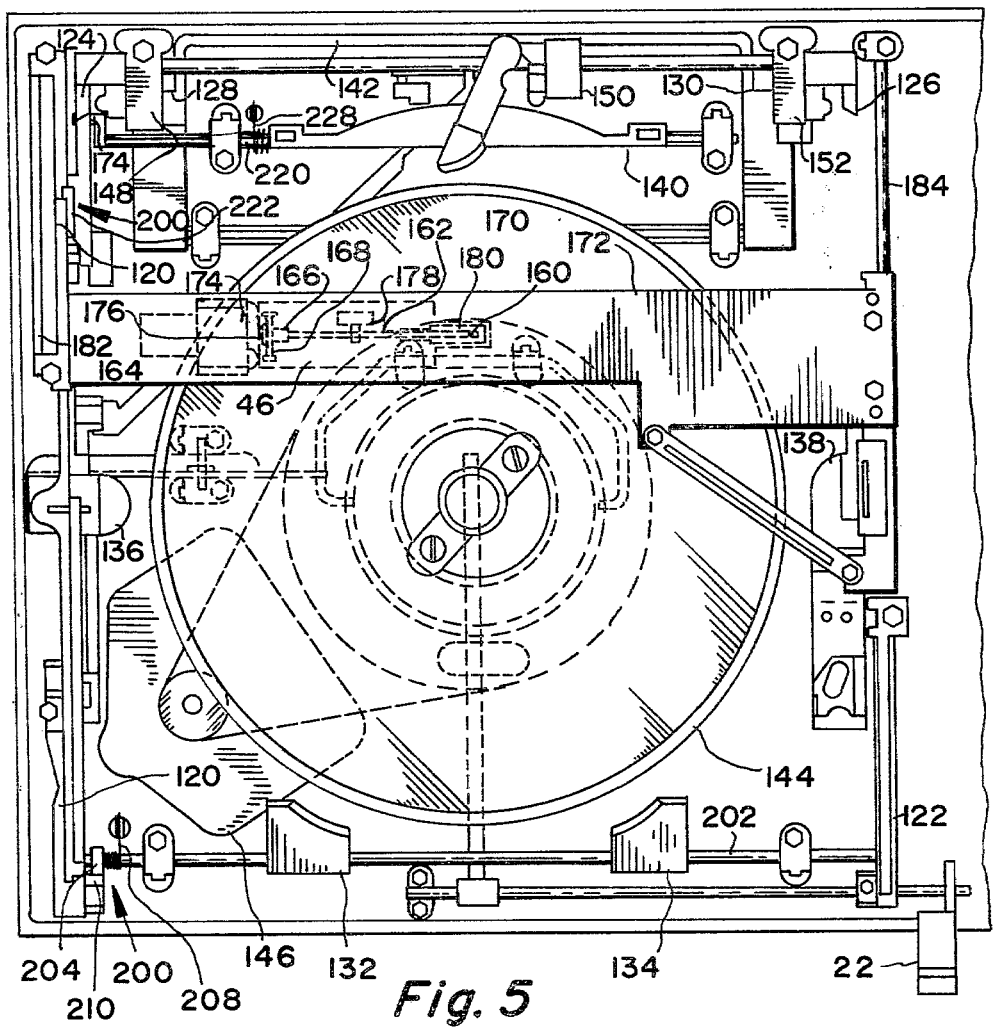
Figure 7:
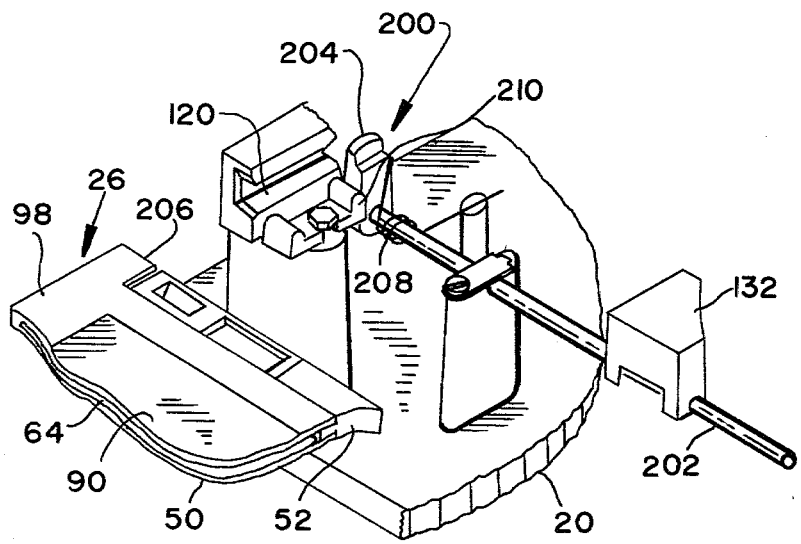
Figure 8:
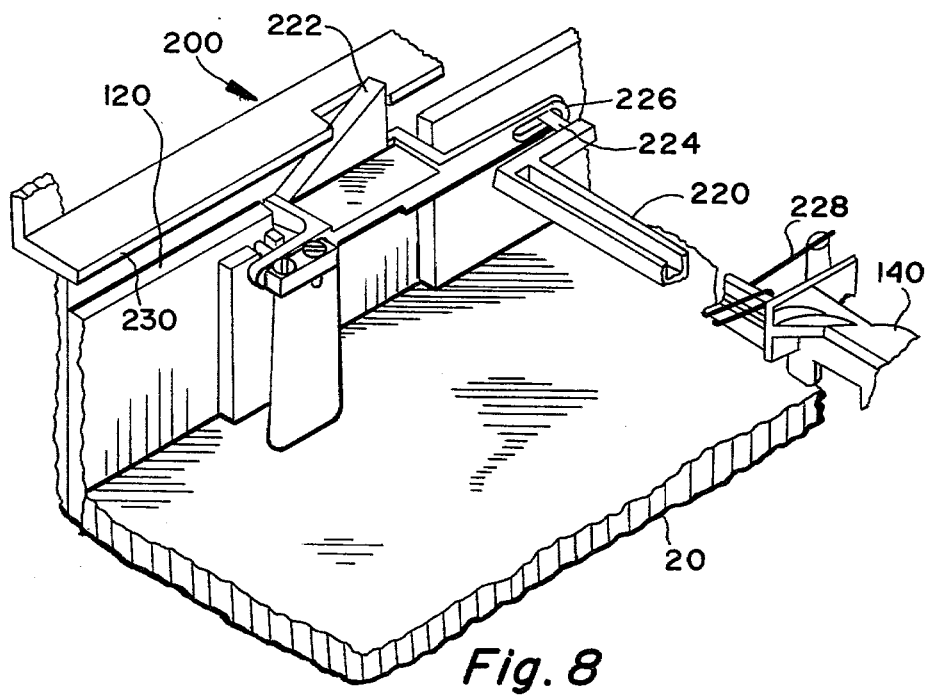

FIG. 5 provides a plan view of the player of FIG. 1;

FIG. 6 illustrates the capacitance pickup concept employed in the player of FIGS. 1 and 5; and FIGS. 7 and 8 depict the details of the subject caddy-actuated apparatus.

Shown in FIG. 1 is a video disc player 20 having the subject caddy-actuated apparatus. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A door 44 is disposed on the cover of the player to provide access to a stylus cartridge 46 which is shown in FIG. 5.

Figure 2:
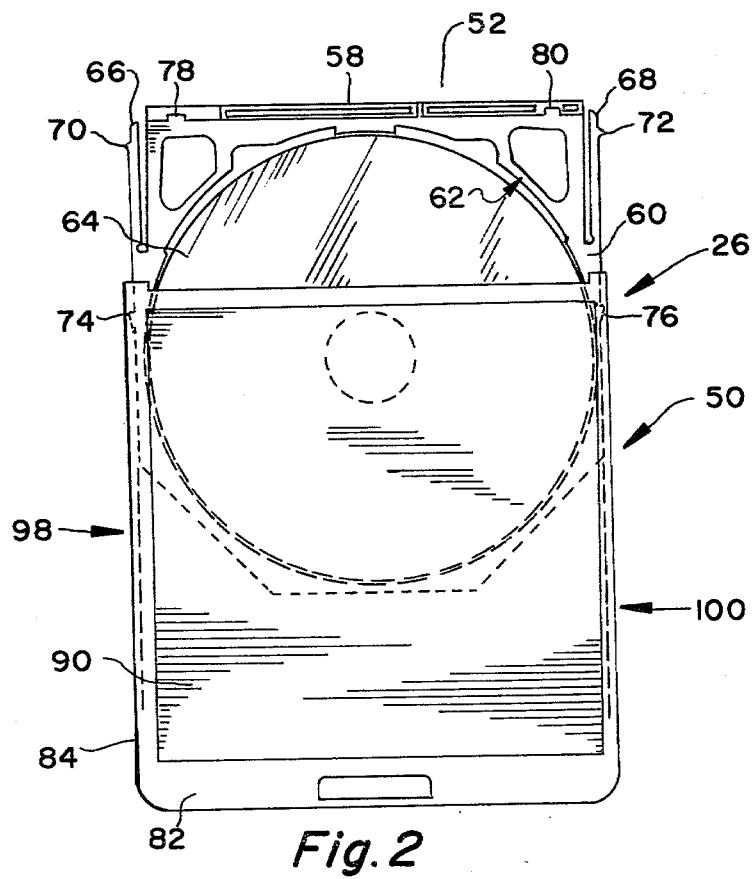
FIG. 2 illustrates a video disc caddy comprising a jacket and a record retaining spine, and suitable for use with the subject apparatus in the practice of the present invention.
Figure 3:
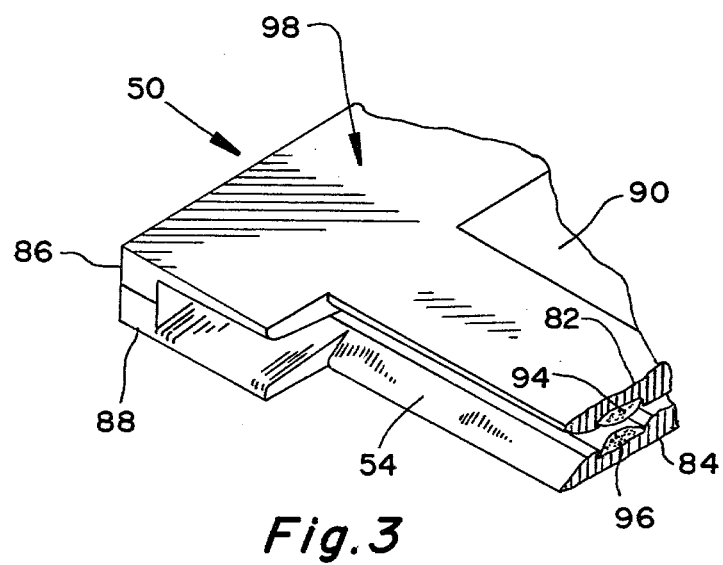
FIG. 3 is a partial perspective view of the jacket of FIG. 2 showing the front section thereof.
Figure 4:
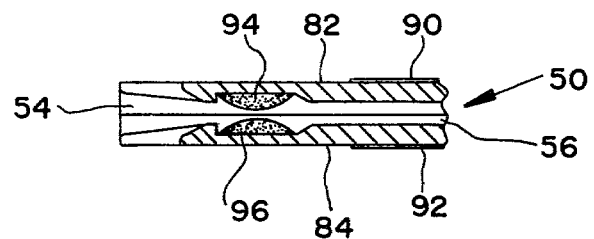
FIG. 4 shows a sectional view of the front section of the jacket of FIGS. 2 and 3.

As shown in FIG. 2, the video disc caddy 26 comprises a jacket 50 and a substantially planar, record retaining spine 52. As shown in FIGS. 3 and 4, the jacket 50 has an edge opening 54 in communication with a cavity 56 for enclosing the record/spine assembly. The spine 52 has a portion 58 which serves as a closure, and a further portion 60 having a circular opening 62 for receiving a centrally-apertured record 64. The spine 52 is further provided with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for locking the spine 52 in place when it is fully inserted therein. The spine 52 is provided with cutouts 78 and 80 for receiving the spine gripper members mounted in the player to secure the spine thereto in the manner explained later.

FIGS. 3 and 4 represent the details of the front section of the jacket 50 of the caddy 26. The jacket 50 comprises a pair of flat plastic panels 82 and 84 which are joined together by any suitable process, e.g., ultrasonic welding. The thickness of each of the panels 82 and 84 is gradually reduced toward the front edge thereof to make the caddy edge opening 54 flared, in the manner shown in FIG. 4, in order to facilitate the insertion of the record/spine assembly into the jacket 50. Each of the panels 82 and 84 is provided with thick ribs, 86 and 88, respectively, along the side edges and the rear edge thereof. The panels 82 and 84, together with the peripheral ribs 86 and 88, form the cavity 56 for enclosing the record/spine assembly. Disposed on the exterior surfaces of the panels 82 and 84 are program labels 90 and 92. Typically, the program labels 90 and 92 contain glossy, 4-color artwork. Each of the panels 82 and 84 is equipped with a lip pad, 94 and 96, respectively, for preventing dust and debris from entering into the record enclosing cavity and for wiping the record each time the record is inserted into, or removed from, the jacket 50.

The non-labeled side edges of the jacket 50 are identified by the numerals 98 and 100. From FIG. 3, it will be seen that the side edges 98 and 100 of the jacket 50 are more rigid compared to the midsection thereof.

The operation of the caddy extraction mechanism will now be explained in conjunction with FIG. 5. To load a record into the player, a caddy 26 is guided into the input slot 24 along a path defined by side rails 120 and 122. As the caddy arrives at a fully inserted position in the player, latch defeat members 124 and 126 enter the jacket 50 to defeat the spine latch fingers 66 and 68 for freeing the spine 52 from the jacket. Pivotally mounted in the player are spine gripper members 128 and 130 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 124 and 126 and is latched to the player through the operation of the spine gripper members 128 and 130, subsequent withdrawal of the jacket leaves the record/spine assembly in the player. The retained record/spine assembly is supported on a set of depressible receiving pads 132, 134, 136, 138 and 140. A pair of springs (not shown) disposed between a gripper arm 142, which carries the spine gripper members 128 and 130, and the latch defeat members 124 and 126 effect downward deflection of the latch defeat members during jacket withdrawal.

To transfer the retained record to a turntable 144, the function lever 22 is displaced to the PLAY position, which, in turn, raises the turntable and starts a turntable motor 146. A set of hold-down members 148, 150 and 152 hold the retained spine 52 in place against the receiving pads 132, 134, 136, 138 and 140 while permitting the retained record to be intercepted by the turntable 144 when it is raised. The hold-down members 148, 150 and 152 also serve to accurately locate the retained spine 52, longitudinally and laterally, in the player.

A pickup stylus 160 is disposed at one end of a stylus arm 162, the other end of which is secured to a latch plate 164 by means of a rubber coupler 166. The latch plate 164, in turn, is suspended in the cartridge 46 by means of a rubber diaphragm 168. The cartridge 46 is placed in a compartment 170 provided in a stylus arm carriage 172, and the carriage lid, not shown, is closed. Disposed in the carriage 172 is a slidably-mounted arm-stretcher transducer 174 (e.g., of the type described in U.S. Pat. No. 3,983,318) which is provided with a latch cup 176 subject to engagement with the latch plate 164. The transducer 174 is advanced in response to the closure of the cartridge lid to establish connection between the latch plate 164 and the latch cup 176.

A stylus arm lifting/lowering mechanism 178 (for example, of the general variety shown in U.S. Pat. No. 4,053,161) is mounted in the carriage 172 to selectively lower the pickup stylus 160 through an opening 180 provided in the bottom wall of the carriage to effect record engagement. During playback, the carriage 172 is translated on guide ways 182 and 184 disposed parallel to the caddy side rails 120 and 122 from a starting position at the back of the player toward the front of the player in synchronism with the radially inward motion of the pickup stylus 160. In the manner indicated in FIG. 6, the variations in capacitance between an electrode 186 carried by the stylus 160 and a conductive property of the record 64 are sensed to reproduce the stored information on the record. The recovered signals are processed to reconstruct a television signal containing picture and sound information for application to a television receiver.

To transfer the record back to the receiving pads 132, 134, 136, 138 and 140 after playback, the function lever 22 is depressed to the LOAD/UNLOAD position, which, in turn, lowers the turntable 144 to a level below the receiving pads. When the turntable 144 is lowered, the record is deposited on the receiving pads 132, 134, 136, 138 and 140 for reception in the opening 62 disposed in the spine 52 to redefine the record/spine assembly. The turntable motor 146 is shut off when the function lever 22 is displaced to the LOAD/UNLOAD position. The location of the receiving pads 132, 134, 136, 138 and 140, occupying the raised position thereof, is such that the record/spine assembly is aligned with the center line of the caddy side rails 120 and 122.

To retrieve the record/spine assembly, the empty jacket 50 is inserted into the player through the input slot 24 along the caddy side rails 120 and 122. As the jacket 50 arrives at the fully inserted position, the front edge thereof engages the already deflected latch defeat members 124 and 126 to cause further downward deflection thereof. Such further downward deflection of the latch defeat members 124 and 126, in turn, effects downward displacement of the spine gripper members 128 and 130, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

As previously indicated, it is desirable to displace the receiving pads 132, 134, 136, 138 and 140 out of the way during the insertion of the caddy into the player. Pursuant to this invention, a caddy-actuated apparatus 200 is provided for operating the receiving pads 132, 134 and 140. The subject apparatus 200 operates the receiving pads 132, 134 and 140 without damaging the caddy labels 90 and 92. The remaining receiving pads 136 and 138 are disposed near the caddy side rails 120 and 122, and are directly actuated by the caddy lower leading edge formed by the intersection of the lower surface 84 and the front face of the caddy. That is, receiving pads 136 and 138 are spring loaded and forced down and out of the way as the caddy, (loaded or unloaded) is inserted into the player. The spring loading of pads 136 and 138 causes these pads to rise up and contribute to the support of the record when the jacket (now separated from the spine) is withdrawn.

FIGS. 7 and 8 illustrate, respectively, the operation of the front receiving pads 132 and 134 and the rear receiving pad 140. As shown in FIGS. 5 and 7, the front receiving pads 132 and 134 are disposed on a pivotally mounted shaft 202. An actuating lever 204 is mounted on the shaft 202 near the caddy side rail 120 for engagement with a side edge of the caddy 26 during the insertion thereof into the player. As the caddy 26 is inserted into the player with SIDE 1 facing up, in the manner shown in FIG. 7, a portion 206 of the leading edge or face of the caddy 26 rotates the actuating lever 204 disposed on the shaft 202 to deflect the front receiving pads 132 and 134 out of the caddy insertion path. The front receiving pads 132 and 134 are then held down by the bottom wall 84 of the caddy 26 as the caddy is further inserted into the player. When the caddy 26 is withdrawn from the player, a coil spring 208 returns the actuating lever 204 to a position against a stop 210 fixedly mounted in the player. When the actuating lever 204 is disposed against the stop 210, the front receiving pads 132 and 134 occupy the raised position thereof.

The operation of the rear receiving pad 140 is similar to the operation of the front receiving pads 132 and 134, and will now be described in reference to FIGS. 5 and 8. The rear receiving pad 140 is disposed on a shaft 220 pivotally mounted at the rear of the player. An actuating cam 222 is pivotally secured near the caddy side rail 120. An offset portion 224 of the shaft 220 is received in a slot 226 disposed in the cam 222. When the caddy 26 is inserted into the player, the cam 222 is depressed, which, in turn, rotates the rear receiving pad 140 out of the way. A coil spring 228, shown in FIG. 5, returns the cam 222 to a position against a fixedly disposed surface 230 upon caddy withdrawal. The rear receiving pad 140 is located at the raised position thereof when the cam 222 is disposed against the surface 230. As previously indicated, when the receiving pads 132, 134, 136, 138 and 140 are disposed in the raised position thereof, a record/spine assembly resting on the receiving pads is aligned with the center line of the caddy side rails 120 and 122 to facilitate the return of the record/spine assembly into the jacket 50 as it is inserted into the player.

What is claimed is:

1. In a record player for recovering prerecorded information from a disc record subject to removable occupancy of a protective caddy; said player being provided with a record extracting mechanism for removing the enclosed record from said caddy from retention in said player during a caddy withdrawal subsequent to a full insertion of an occupied caddy into said player; said player having a pair of side rails for guiding the caddy along a path; an empty caddy being inserted into said player along said side rails to retrieve a record retained in said player; said player being equipped with a plurality of depressible receiving pads for supporting a retained record; the location of said receiving pads occupying a raised position thereof being such that a retained record resting on said receiving pads is aligned with said side rails in order to facilitate the return of the retained record into said caddy when it is inserted into said player for record retrieval; the improvement comprising means located adjacent to one of said side rails and subject to engagement with a portion of a leading surface of said caddy during an insertion thereof into said player for depressing at least one of said plurality of pads to a lowered position out of said caddy path.

2. The player as defined in claim 1 wherein a first set of said receiving pads are disposed on a shaft pivotally mounted in said player near the input end thereof for motion between said raised position and said lowered position; said player having means for biasing said first set of receiving pads to occupy said raised position thereof; wherein said improvement comprises a first actuating member disposed on said shaft near said one side rail and subject to engagement with said portion of said leading surface of said caddy during an insertion thereof into said player for deflecting said first set of receiving pads to said lowered position.

3. The player as defined in claim 2 wherein said biasing means comprises a spring disposed between said actuating member and a point fixedly disposed in said player.

4. The player as defined in claim 3 wherein one of said depressible receiving pads is located adjacent to said record extracting mechanism on a further shaft pivotally mounted in said player for motion between said raised position and said lowered position; said player having further means for biasing said one receiving pad to occupy said raised position thereof; said improvement further including a second actuating member for displacing said one receiving pad away from said caddy insertion path in response to a caddy insertion into said player.

* * * * *

UNITED STATES PATENT AND TRADEMARK OFFICE
CERTIFICATE OF CORRECTION

PATENT NO. : 4,357,698
DATED : November 2, 1982
INVENTOR(S) : Leslie Albert Torrington It is certified that error appears in the above—identified patent and that said Letters Patent is hereby corrected as shown below:

Col. 1, Line 40

"thereof" should be - thereof, - .

Col. 3, Line 55

"whle" should be - while-.

Col. 6, Line 2

"caddy from retention" should be - caddy for retention -.

Signed and Sealed this

Eleventh Day of January 1983

[SEAL]

Attest:

GERALD J. MOSSINGHOFF

Attesting Officer

Commissioner of Patents and Trademarks